Nov. 2, 1965 R. L. REINER 3,215,950

CONTROLLED RECTIFIER DUAL RELAXATION CIRCUIT PULSE GENERATOR

Filed Jan. 19, 1962

INVENTOR.
ROBERT L. REINER
BY
Henry L. Reiner
ATTORNEY

United States Patent Office 3,215,950

Patented Nov. 2, 1965

3,215,950
CONTROLLED RECTIFIER DUAL RELAXATION CIRCUIT PULSE GENERATOR

Robert L. Reiner, West Caldwell, N.J., assignor to Nuclear Corporation of America, Denville, N.J., a corporation of Delaware Filed Jan. 19, 1962, Ser. No. 167,301
6 Claims. (Cl. 331—111)

My invention relates to an electronic pulse generator and more particularly to a circuit for generating a train of pulses, the repetition rate and the pulse width of which can be independently controlled.

There are known in the prior art circuits for generating a train or series of pulses as required for the operation of various devices. Generally these circuits of the prior art have a constant repetition rate and a pulse width which is constant as determined by the components of the circuit. Where provision is made for adjusting either the pulse repetition rate or the pulse width, adjustment of one of these affects the other and the adjusting circuits generally are complicated for the result achieved thereby. Moreover, they are not as efficient as is desirable.

I have invented an electronic pulse generator for generating a series of pulses, the repetition rate of which and the pulse width of which may independently be controlled. My circuit is extremely simple for the result achieved thereby. Its efficiency of operation adapts it for use in battery-powered portable instruments. One form of my invention is provided with means for ensuring that the operation of the circuit is independent of temperature changes.

One object of my invention is to provide an electronic pulse generator in which the pulse width and the pulse repetition rate can be independently controlled.

Another object of my invention is to provide an electronic pulse generator in which either one of the pulse width and pulse repetition rate may be adjusted without appreciably affecting the other.

A further object of my invention is to provide an electronic pulse generator which is extremely simple for the result achieved thereby.

Yet another object of my invention is to provide an electronic pulse generator which is highly efficient.

A still further object of my invention is to provide an electronic pulse generator, the operation of which is substantially independent of temperature.

Other and further objects of my invention will appear from the following description.

In general my invention contemplates the provision of an electronic pulse generator in which a first capacitor charges through a variable resistor to apply voltage to a diode of the type which breaks down when its breakover voltage is exceeded. When the diode breaks down, it raises the lower potential side of the capacitor to the source potential to cause the capacitor to charge a second capacitor through a second variable resistor to apply a potential to a second diode which breaks down when its breakover voltage is exceeded to actuate a capacitor discharging circuit which discharges the first capacitor to terminate the pulse of voltage. The value of the first variable resistor determines the pulse repetition rate while the value of the second variable resistor determines the pulse width.

In the accompanying drawings which form part of the instant specification and which are to be read in conjunction therewith and in which like reference numerals are used to indicate like parts in the various views.

Figure 1:
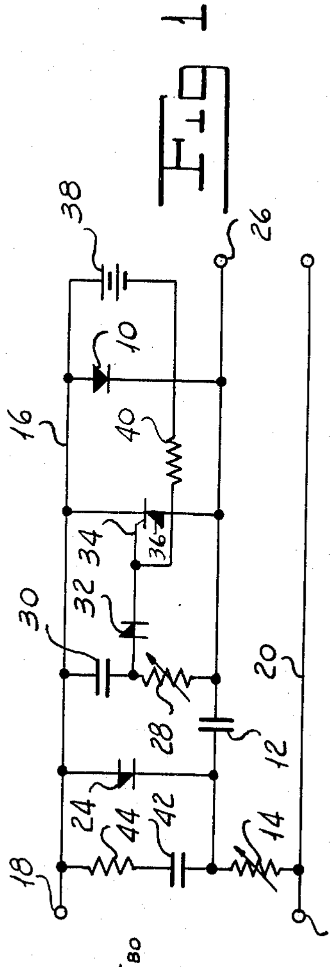
FIGURE 1 is a schematic view of one form of my electronic pulse generator.

Referring now to FIGURE 1 of the drawings, I connect a diode 10, a capacitor 12 and a variable resistor 14 in series between a conductor 16 connected to the positive terminal 18 of a suitable source of potential and a conductor 20 connected to the negative or ground terminal 22 of the source. With these connections capacitor 12 charges toward the potential at terminal 18 at a rate determined by the valve of the resistor 14. I connect a diode 24 of the four-layer type which breaks down when its breakover voltage is exceeded between conductor 16 and one terminal of the capacitor 12.

Figure 3:
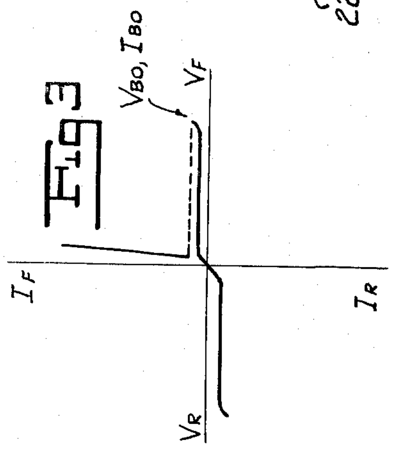
FIGURE 3 is a diagram illustrating the characteristics of a diode forming an element of my electronic pulse generator.

Referring to FIGURE 3, I have illustrated the characteristic of a four-layer diode such as the diode 24. As can be seen by reference to the figure, as the forward voltage $V_F$ applied to the diode increases the diode draws negligible current until such time as its breakover voltage $V_{BO}$ is reached at which time as its breakover down and the current drawn is substantially independent of the voltage across the diode. Diodes of this type may have a control input terminal, such as diode 36 with control input terminal 34, to which a gating current may be applied to initiate breakover and permit the diode to conduct at a lower value of forward voltage. As will be explained hereinafter, I make use of this characteristic in the discharge circuit of my pulse generator.

It will be appreciated that as capacitor 12 charges the potential across diode 24 increases until the breakover potential is reached at which time the diode conducts to raise the terminal of capacitor 12 connected to the diode to substantially the potential at terminal 18. It will be appreciated that the other terminal of the capacitor 12 is at a higher potential. This causes a sharp rise in the potential of an output terminal 26 connected to capacitor 12.

I connect a second variable resistor 28 and a capacitor 30 in series between conductor 16 and the terminal of capacitor 12 other than that to which diode 24 is connected. When the diode 24 breaks down, capacitor 30 begins charging through resistor 28 owing to the fact that the side of the capacitor 12 connected to terminal 26 is higher than the potential of terminal 18. I connect a second diode 32 of the type which breaks down when its breakover voltage is exceeded between the common terminal of resistor 28 and capacitor 30 and the gating or control terminal 34 of a diode 36. Diode 36 is of the same general type as diodes 24 and 32 with the exception that the potential applied to its gating element 34 determines its breakover voltage. As capacitor 30 charges, the potential across diode 32 changes until the breakover voltage of this diode is exceeded at which time diode 32 breaks down to apply a pulse of voltage to control element 34 to render diode 36 conductive to discharge capacitor 12. This discharge of capacitor 12 marks the end of a pulse. It will be appreciated that since the value of resistor 28 controls the rate at which capacitor 30 charges and thus the time it takes for capacitor 30 to build up to the breakover voltage of diode 32, resistor 28 determines the pulse width. I connect a battery 38 and a resistor 40 in series between conductor 16 and the control terminal 34 to apply a small reverse biasing current to the diode 36. A capacitor 42 and a resistor 44 in series across the diode 24 provide a holding circuit so that when diode 24 breaks down it does not immediately release but is held on until the diode 36 conducts to terminate the pulse. This arrangement avoids the possibility of the occurrence of multi-pulsing since diodes such as diode 24 have breakover voltages which are usually sensitive to rate of change of applied voltage; such that, the breakover voltage is reduced greatly as the rate of applied voltage is increased.

Figure 2:
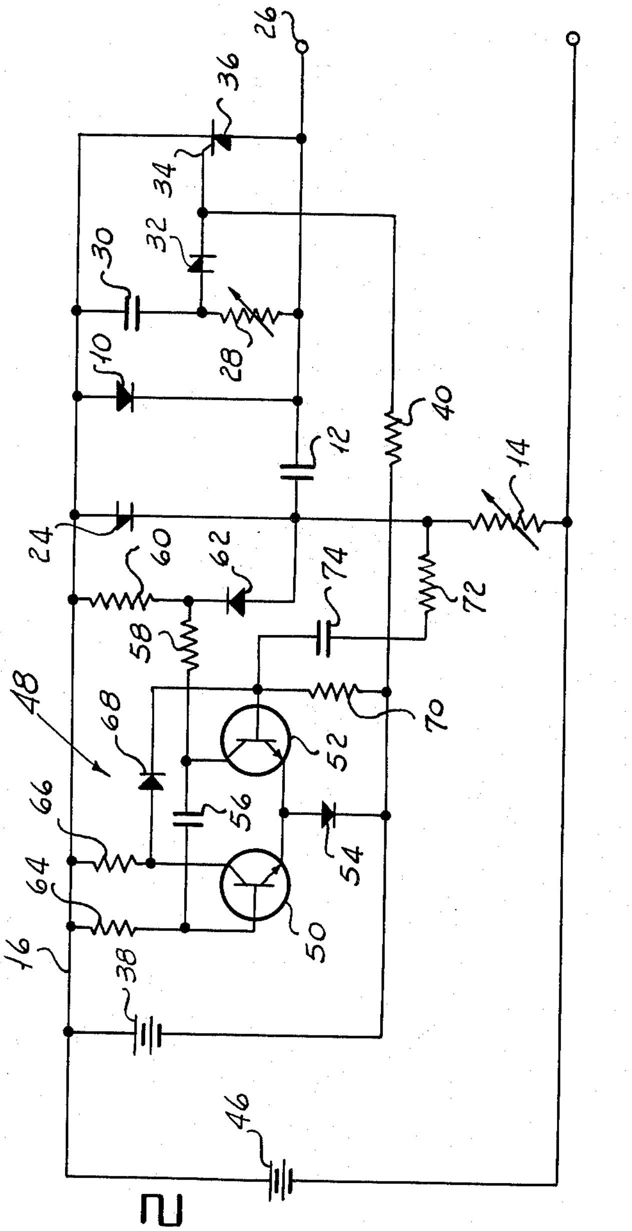
FIGURE 2 is a schematic view of another form of my electronic pulse generator which is substantially independent of temperature.

Referring now to FIGURE 2, I have shown a form of my electronic pulse generator the operation of which is substantially independent of temperature. In this figure I have indicated like parts to those shown in FIGURE 1 by the same reference characters. In this form of my invention a battery 46 provides the source of potential for the circuit. I have replaced the holding circuit including capacitor 42 and resistor 44 by a driven, one-shot multivibrator, indicated generally by the reference character 48. Multivibrator 48 includes a pair of n-p-n transistors 50 and 52, the emitters of which are connected by a diode 54 to the common terminal of battery 38 and resistor 40. A capacitor 56 couples the base of transistor 50 to the collector of transistor 52. A resistor 58 connects the collector of transistor 52 to the common terminal of a resistor 60 and a diode 62 connected in series across the diode 24. Respective resistors 64 and 66 connect the base and the collector of transistor 50 to the conductor 16. I connect a diode 68 and a resistor 70 in series between the collector of transistor 50 and the terminal of resistor 40 connected to battery 38 such that the base of transistor 52 is connected to diode 68 and resistor 70.

The arrangement of the driven, one-shot multivibrator 48 shown in FIGURE 2 is such that transistor 50 normally conducts while transistor 52 is normally cut off. A series circuit including a resistor 72 and a capacitor 74 connected between the upper terminal of resistor 14 and the base of transistor 52 is adapted to apply a positive pulse to the multivibrator to cause transistor 52 to conduct and to cut transistor 50 off.

Considering the circuit at the time just before the breakover voltage of diode 24 is reached, the voltage drop across the capacitor 12 is approaching the breakover voltage. When this potential is reached, as in the circuit shown in FIGURE 1, diode 24 conducts to bring the terminal of capacitor 12 to substantially the potential of conductor 16. When this occurs, a positive going pulse of voltage is applied through resistor 72 and capacitor 74 to the base of transistor 52 to cause this transistor to conduct and at the same time to cut transistor 50 off. In this manner a holding current is applied to the diode 24 to keep it in the conductive state. The duration of this holding current is determined by the circuit constant of the multivibrator which is adjusted to be somewhat longer than the maximum pulse width desired. The diode 62 is a decoupling diode which allows the capacitor 12 to charge back toward ground at the time of the multivibrator pulse. Following the breakdown of diode 24, capacitor 30 begins to charge through resistor 28 until such time as the four-layer diode 32 breaks down to transfer the charge on capacitor 30 to the control electrode of controlled diode 36 which completes the discharge path for capacitor 12 through diode 24, capacitor 12 and back through diode 36. When this action is complete, the voltage pulse is terminated and capacitor 12 and capacitor 30 both are completely discharged. However, diode 24 is still conducting the holding current supplied through the multivibrator. The multivibrator now reverts back to the state at which transistor 50 is normally on and transistor 52 is off thus interrupting the holding current flowing from battery 38 through diode 24, through diode 62, through resistor 58, through transistor 52, through diode 54 and back to the battery 38. Now when the voltage across capacitor 12 again builds up to the breakover voltage for diode 24 the cycle repeats. This arrangement shown in FIGURE 2 is substantially independent of temperature change.

In operation of the form of my pulse generator shown in FIGURE 1, capacitor 12 begins to charge from terminal 18 through conductor 16, through diode 10 and through the capacitor 12 and resistor 14 at a rate determined by the value of resistor 14. When the potential across capacitor 12 reaches the breakover voltage of diode 24, this diode conducts to raise the potential of the capacitor terminal connected to the diode substantially to the potential at terminal 18. This point marks the beginning of an output pulse. At this time the potential of the terminal of capacitor 12 connected to resistor 28 is above the source potential with the result that capacitor 30 begins to charge. When the potential across capacitor 30 reaches the breakover voltage of diode 32, this diode breaks down and the potential at the control electrode of diode 36 is such as will cause diode 36 to break down to discharge capacitor 12 through a circuit from the capacitor through diode 36 and through diode 24 and back to the capacitor. This marks the end of the pulse. As is explained hereinabove, the circuit including resistor 44 and capacitor 42 provides a holding current which ensures that diode 24 remains conductive until the end of a pulse. When the potential across capacitor 12 again builds up to the breakover voltage of diode 24, the cycle repeats. The interpulse time is determined by the value of resistor 14 while the pulse width is determined by the value of resistor 28.

It will be seen that I have provided a circuit which operates properly with non-ideal components such as the rate-sensitive diode 24. For example if a pair of diodes such as diode 24 were connected in series between the high voltage terminal of capacitor 12 and conductor 16 and if a conventional diode were used to couple the voltage from the common terminal of resistor 28 and capacitor 30 to the common terminal of the series connected diodes, it would be thought that the circuit would operate properly owing to the fact that the overall breakover voltage of the series-connected diodes exceeds that of diode 24. As a matter of fact, however, upon the application of a fast-rising step of voltage to the series-connected diodes they can, depending on the rate of voltage rise, breakover at around one-tenth of the aggregate D.C. breakover voltage. This is due to internal device capacitance which transfers charge and causes premature breakdown.

My circuit avoids the operation discussed above and permits the use of rate-sensitive components such as diode 36 by the reverse bias of battery 38. It will readily be appreciated that a cold cathode thyratron could be substituted for diodes 36 and 32 by connecting the thyratron grid to the junction of resistor 28 and capacitor 30; the cathode to conductor 16 and the anode to terminal 26. The advantage of the circuit shown in FIGURE 1 over the thyratron circuit is that the circuit shown in FIGURE 1 permits the production of pulses having widths less than one-tenth the minimum obtainable with the thyratron and improved stability.

The operation of the circuit shown in FIGURE 2 is substantially the same as that of the circuit shown in FIGURE 1 with the exception that the holding current for the diode 12 is supplied through the multivibrator 48 with the result that the operation of the circuit is substantially independent of temperature variations.

In summary, the circuit paths for charging and discharging the capacitors 12 and 30 of the form of my generator shown in FIGURE 1, for example, may readily be traced. Upon initiation of the operation, current flows from terminal 18 through conductor 16, through diode 10, through capacitor 12 and through resistor 14 to terminal 22 to charge capacitor 12 toward the potential across terminals 18 and 22. It will readily be appreciated at this time that the diode 24 shunts capacitor 12 through diode 10. When the capacitor voltage reaches the critical firing voltage of diode 24, the diode breaks down to connect the potential at terminal 18 to that terminal of capacitor 12 which is connected to diode 24. Thus, the potential of the other plate is raised to a level at which diode 10 is reverse biased. Now capacitor 30 charges through a circuit from capacitor 12 through resistor 28, through capacitor 30 and through diode 24 back to the capacitor 12. Capacitor 30 tends to charge to a value of potential equal to the potential of the plate of capacitor 12 connected to resistor 28 over that of the terminal 18. During this time, the diode 32 which shunts the capacitor 30 is not yet conductive. Ultimately, the potential across capacitor 30 reaches the firing voltage of the diode 32 to cause the diode to fire, which firing in turn causes the diode 36 to fire. The firing of diode 36 shunts the reverse biased diode 10 to provide a path for discharging capacitor 12. The circuit then is ready for the next operation.

It will be seen that I have accomplished the objects of my invention. I have provided an electronic pulse generator in which the interpulse time and the pulse width are independently controlled. My circuit is extremely simple for the result achieved thereby. Pulse width can be changed without appreciably affecting the repetition rate and vice versa. The operation of my circuit is highly efficient so that it is adapted for use in portable, battery-powered instruments. In have provided a preferred form of my invention which is substantially independent of the temperature variation.

It will be understood that certain features and subcombinations are of utility and may be employed without reference to the other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A pulse generator including in combination a source of potential, a first capacitor, a second capacitor, a first resistor, a second resistor, a diode, a first nonlinear impedance having a high impedance state and adapted to trigger to a low impedance state in response to a critical voltage applied thereto, said critical voltage having a magnitude less than the magnitude of said source potential, a second nonlinear impedance having a high impedance state and adapted to trigger to a low impedance state in response to a firing voltage applied thereto, said firing voltage having a magnitude less than the magnitude of said critical voltage, means connecting said diode and said first capacitor in a first series circuit, means connecting said source and said first resistor to said first series circuit to charge said capacitor toward the potential of said source through said diode, means connecting said first nonlinear impedance in shunt with said first series circuit, means connecting said second resistor and said second capacitor in a second series circuit, means connecting said second nonlinear impedance in shunt with said second capacitor, means responsive to the low impedance state of said first impedance for applying said first capacitor voltage to said second series circuit to reverse bias said diode, and means responsive to firing of said second impedance for providing a low impedance in shunt with said reverse biased diode to discharge said first capacitor.

2. A pulse generator including in combination a source of potential, a first capacitor, a second capacitor, a first resistor, a second resistor, a diode, a first nonlinear impedance having a high impedance state and adapted to trigger to a low impedance state in response to a critical voltage applied thereto, said critical voltage having a magnitude less than the magnitude of said source potential, a second nonlinear impedance having a high impedance state and adapted to trigger to a low impedance state in response to a firing voltage applied thereto, said firing voltage having a magnitude less than the magnitude of said critical voltage, means connecting said diode and said first capacitor in a first series circuit, means connecting said source and said first resistor to said first series circuit to charge said capacitor toward the potential of said source through said diode, means connecting said first nonlinear impedance in shunt with said first series circuit, means connecting said second resistor and said second capacitor in a second series circuit, means connecting said second nonlinear impedance in shunt with said second capacitor, means responsive to the low impedance state of said first impedance for applying said first capacitor voltage to said second series circuit to reverse bias said diode, means responsive to firing of said second impedance for providing a low impedance in shunt with said reverse biased diode to discharge said first capacitor and to produce output pulses, and means for varying the resistance of said first resistor to vary the time of occurrence of said pulses.

3. A pulse generator including in combination a source of potential, a first capacitor, a second capacitor, a first resistor, a second resistor, a diode, a first nonlinear impedance having a high impedance state and adapted to trigger to a low impedance state in response to a critical voltage applied thereto, said critical voltage having a magnitude less than the magnitude of said source potential, a second nonlinear impedance having a high impedance state and adapted to trigger to a low impedance state in response to a firing voltage applied thereto, said firing voltage having a magnitude less than the magnitude of said critical voltage, means connecting said diode and said first capacitor in a first series circuit, means connecting said source and said first resistor to said first series circuit to charge said capacitor toward the potential of said source through said diode, means connecting said first nonlinear impedance in shunt with said first series circuit, means connecting said second resistor and said second capacitor in a second series circuit, means connecting said second nonlinear impedance in shunt with said second capacitor, means responsive to the low impedance state of said first impedance for applying said first capacitor voltage to said second series circuit to reverse bias said diode, means responsive to firing of said second impedance for providing a low impedance in shunt with said reverse biased diode to discharge said first capacitor and to produce output pulses and means for varying the resistance of said second resistor to vary the width of said output pulses.

4. A pulse generator including in combination a source of potential, a first capacitor, a second capacitor, a first resistor, a second resistor, a diode, a first nonlinear impedance having a high impedance state and adapted to trigger to a low impedance state in response to a critical voltage applied thereto, said critical voltage having a magnitude less than the magnitude of said source potential, a second nonlinear impedance having a high impedance state and adapted to trigger to a low impedance state in response to a firing voltage applied thereto, said firing voltage having a magnitude less than the magnitude of said critical voltage, means connecting said diode and said first capacitor in a first series circuit, means connecting said source and said first resistor to said first series circuit to charge said capacitor toward the potential of said source through said diode, means connecting said first nonlinear impedance in shunt with said first series circuit, means connecting said second resistor and said second capacitor in a second series circuit, means connecting said second nonlinear impedance in shunt with said second capacitor, means responsive to the low impedance state of said first impedance for applying said first capacitor voltage to said second series circuit to reverse bias said diode, means responsive to firing of said second impedance for providing a low impedance in shunt with said reverse biased diode to discharge said first capacitor and to produce output pulses, means for varying the resistance of said first resistor to vary the time of occurrence of said output pulses and means for varying the resistance of said second resistor to vary the width of said output pulses.

5. A pulse generator including in combination a source of potential, a first capacitor, a second capacitor, a first resistor, a second resistor, a diode, a first nonlinear impedance having a high impedance state and adapted to trigger to a low impedance state in response to a critical voltage applied thereto, said critical voltage having a magnitude less than the magnitude of said source potential, a second nonlinear impedance having a high impedance state and adapted to trigger to a low impedance state in response to a firing voltaeg applied thereto, said firing voltage having a magnitude less than the magnitude of said critical voltage, means connecting said diode and said first capacitor in a first series circuit, means connecting said source and said first resistor to said first series circuit to charge said capacitor toward the potential of said source through said diode, means connecting said first nonlinear impedance in shunt with said first series circuit, means connecting said second resistor and said second capacitor in a second series circuit, means connecting said second nonlinear impedance in shunt with said second capacitor, means responsive to the low impedance state of said first impedance for applying said first capacitor voltage to said second series circuit to reverse bias said diode, means responsive to firing of said second impedance for providing a low impedance in shunt with said reverse biased diode to discharge said first capacitor and means for holding said first nonlinear impedance in its low impedance state until said second nonlinear impedance fires.

6. A pulse generator including in combination a source of potential, a first capacitor, a second capacitor, a first resistor, a second resistor, a diode, a first nonlinear impedance having a high impedance state and adapted to trigger to a low impedance state in response to a critical voltage applied thereto, said critical voltage having a magnitude less than the magnitude of said source potential, a second nonlinear impedance having a high impedance state and adapted to trigger to a low impedance state in response to a firing voltage applied thereto, said firing voltage having a magnitude less than the magnitude of said critical voltage, means connecting said diode and said first capacitor in a first series circuit, means connecting said source and said first resistor to said first series circuit to charge said capacitor toward the potential of said source through said diode, means connecting said first nonlinear impedance in shunt with said first series circuit, means connecting said second resistor and said second capacitor in a second series circuit, means connecting said second nonlinear impedance in shunt with said second capacitor, means responsive to the low impedance state of said first impedance for applying said first capacitor voltage to said second series circuit to reverse bias said diode, means responsive to firing of said second impedance for providing a low impedance in shunt with said reverse biased diode to discharge said first capacitor, means comprising a driven one-shot multivibrator having output terminals connected to said first nonlinear impedance and having a control terminal for receiving a signal to actuate said multivibrator for holding said first nonlinear impedance in its low impedance state until said second nonlinear impedance fires and means responsive to triggering of said first nonlinear impedance for applying a signal to said control terminal.

References Cited by the Examiner

UNITED STATES PATENTS

| | | | |
|---|---|---|---|
| 2,906,963 | 9/59 | Wolf | 331—144 |
| 2,997,665 | 8/61 | Sylvan | 331—144 X |
| 3,074,028 | 1/63 | Mammano | 331—111 |

ROY LAKE, *Primary Examiner.*

JOHN KOMINSKI, *Examiner.*